United States Patent [19]

Li et al.

[11] Patent Number: 4,979,130
[45] Date of Patent: Dec. 18, 1990

[54] METHOD OF CREATING HOLLOW MULTISTROKE CHARACTERS

[75] Inventors: Hsun-Feng Li; Yih-Trong Hsieh, both of Taiwan, Taiwan

[73] Assignee: Industrial Technology Research Institute, Taiwan

[21] Appl. No.: 519,260

[22] Filed: May 2, 1990

Related U.S. Application Data

[63] Continuation of Ser. No. 109,908, Oct. 19, 1987, abandoned.

[51] Int. Cl.[5] .............................................. G06F 15/62
[52] U.S. Cl. .................................... 364/518; 364/521; 340/730; 340/735
[58] Field of Search ................ 364/518, 521; 340/730, 340/735, 790

[56]  References Cited

U.S. PATENT DOCUMENTS 4,531,120  7/1985  Brownell, Jr. et al. ........ 340/735 X
4,740,783  4/1988  Lawrence et al. .............. 340/790 X

OTHER PUBLICATIONS

Foley and Van Dam, Fundamentals of Interactive Computer Graphics, 1982, pp. 456–460.

Primary Examiner—Dale M. Shaw
Assistant Examiner—Mark K. Zimmerman
Attorney, Agent, or Firm—Cahill, Sutton & Thomas

[57]  ABSTRACT

A method of generating hollow multistroke characters. First and second bit maps are created using border and interior data from a polygon fill drawing a first stroke. Data from the polygon fill drawing a second stroke is processed in a RMW LOGIC utilizing data signals from the first and second bit maps to modify the two bit maps. When completed the second bit map contains a depiction of the interiors of the strokes employed to create the character. When completed the first bit map contains a depiction of all of the borders of all of these strokes except those portions of the borders residing in the same addresses as the addresses of interior depiction in the second bit map. The character is made legible by displaying the first bit map on a cathode ray tube.

6 Claims, 2 Drawing Sheets

FIG.1
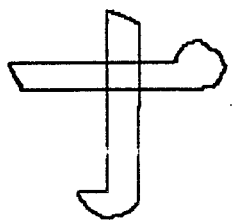
FIG.2
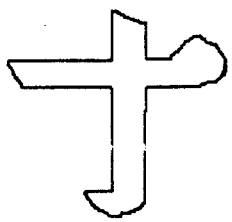
FIG.3
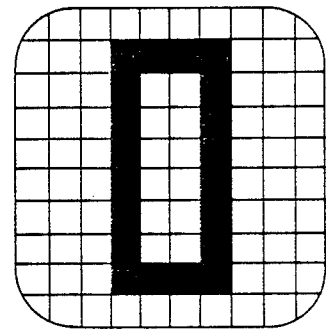
FIG.4a
FIG.4b
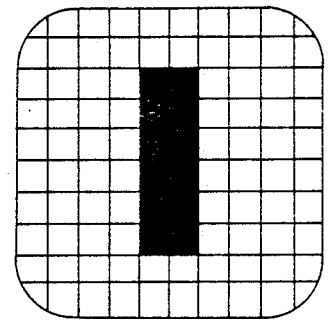
FIG.5a
FIG.5b
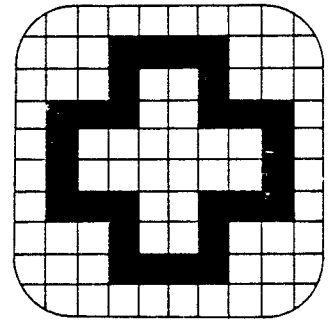
FIG.6a
FIG.6b
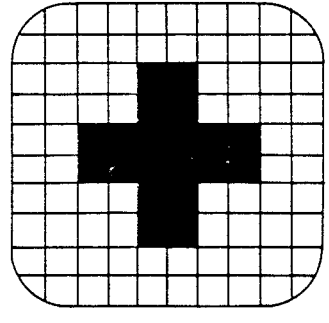
FIG.7a
FIG.7b

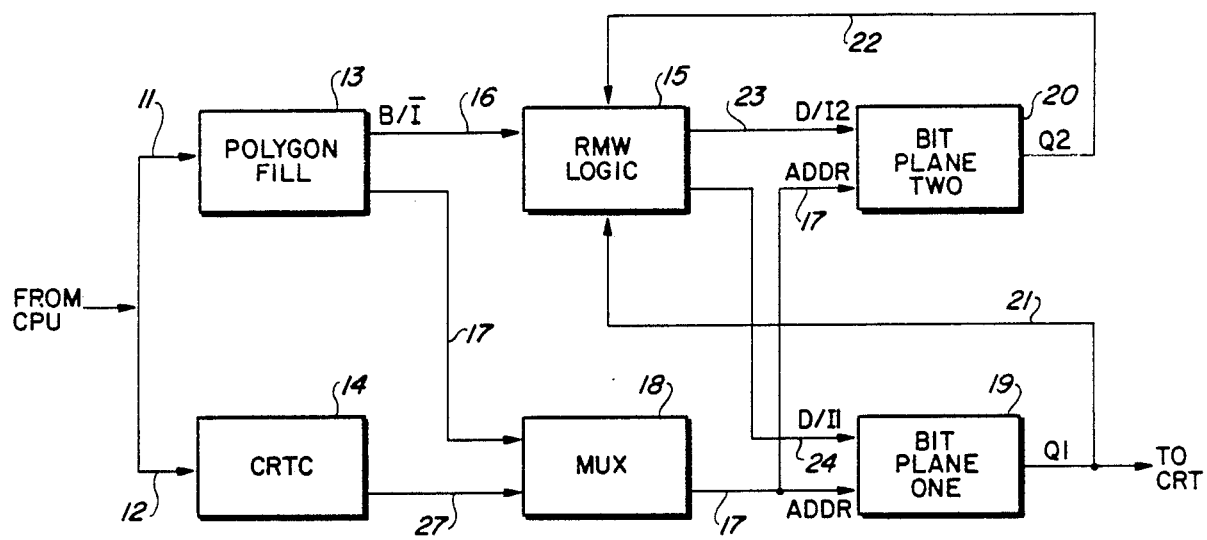
_Fig. 8_
| | | B/$\overline{I}$ | | | |
|---|---|---|---|---|---|
| | | 0 | | 1 | |
| Q2 | Q1 | D/I2 | D/I1 | D/I2 | D/I1 |
| 0 | 0 | 1 | 0 | 0 | 1 |
| 0 | 1 | 1 | 0 | 0 | 1 |
| 1 | 0 | 1 | 0 | 1 | 0 |
| 1 | 1 | X | X | X | X |
_Fig. 9_
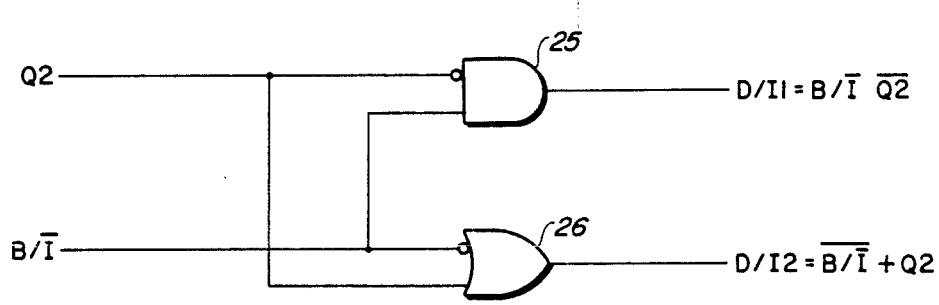
_Fig. 10_

METHOD OF CREATING HOLLOW MULTISTROKE CHARACTERS

This application is a continuation of application Ser. No. 07/109,908 filed Oct. 19, 1987, now abandoned.

TECHNICAL FIELD

This invention is concerned with computer graphic generation of multicomponent characters or figures.

BACKGROUND ART

Computer graphic techniques have proven to be particularly effective in the generation and manipulation of multistroke characters such as those employed in Chinese writing. It is quite easy, for example, to create on the screen of a cathode ray tube a multistroke character such as that illustrated in FIG. 1 of the drawings. And one of the advantages of computer character generation is that the size of the character can be readily adjusted with simple programs.

In many instances it is desirable to present a character in border, or outline, i.e. hollow, form only. By utilizing a suitable algorithm it is possible to analyze each stroke of the character and produce an image representing the borders only of the stroke. In the case of the multistroke character with overlaying strokes this results in an undesirable, or imperfect, hollow character such as that depicted in FIG. 2. The desired hollow character has the quality illustrated in FIG. 3. Note that no border lines appear within the interior of the character.

Techniques have been developed for processing hollow characters such as shown in FIG. 3. Two such techniques are commonly known as the Differential Method and the Exclusive OR Method. Both of these methods entail the creation first of a solid character and then vertical and horizontal scanning analysis of the solid character to create a border only, hollow, character. These methods are time consuming and require significant quantities of computer memory in order to function.

DISCLOSURE OF THE INVENTION

This invention provides a much faster method of creating hollow, multistroke characters utilizing simple graphic techniques and logic hardware. The method involves the creation of a first bit map depicting the border of a stroke of the character. Such a bit map with digital values indicated therein is shown in FIG. 4a. The pixels corresponding to border portions of the stroke are assigned a value of one (1) and other areas of the matrix assigned a value of zero (0). FIG. 4b is a display of the border bit map shown in FIG. 4a. Simultaneously with the creation of the first bit map of FIG. 4a, there is created a second bit map depicting the interior of that first stroke. This second bit map is shown in FIG. 5a. Pixels corresponding to interior portions of the first stroke are assigned a value of one (1) and other pixels are assigned a value of zero (0). FIG. 5b is a display of the interior bit map of FIG. 5a.

Bit maps shown in 4a and 5a are next modified by superimposing thereon digital values corresponding to the border and the interior of a second stroke. The modification, however, is such that the second bit map depicts the interiors of both the first and second stroke (FIG. 7a) and the first bit map depicts the borders of the first stroke and the second stoke but does not depict any portions of the borders having addresses corresponding to addresses with interior values on the second bit map. The resulting first bit map is shown in FIG. 6a, FIGS. 6b and 7b, respectively, are displays of bit maps in FIGS. 6a and 7a, with FIG. 6b being the display of the final hollow, multistroke character.

Further in accordance with the invention, the modification of the bit maps by subsequent stroke values is accomplished by simple logic hardware producing information signals to the two bit maps on the basis of border/interior information received from a polygon fill and information concerning the prior status of the bit maps.

BRIEF DESCRIPTION OF THE DRAWINGS

FIG. 1 is an illustration of a solid multistroke character;

FIG. 2 is an illustration of an undesirable, imperfect, hollow, multistroke character;

FIG. 3 is an illustration of a desirable hollow multistroke character;

FIGS. 4a, 5a, 6a and 7a are bit map illustrations;

FIGS. 4b, 5b, 6b and 7b are displays of bit maps 4a, 5a, 6a and 7a, respectively;

FIG. 8 is a block diagram of computer graphics hardware and software for practicing the invention;

FIG. 9 is a truth table useful for understanding the invention; and

FIG. 10 is a diagram of a logic employed in practicing the invention. BEST MODE FOR CARRYING OUT THE INVENTION The hardware and software for carrying out the invention is illustrated in block diagram form in FIG. 8. Signals from a central processing unit (CPU) (not shown) are supplied via control buses 11 and 12 to a polygon fill 13 and a cathode ray tube controller (CRTC) 14. The CPU instructs polygon fill 13 as to what character is to be created and whether the operator desires the character to be solid or hollow. This invention is concerned primarily with the economical and reliable creation of hollow multistroke characters, particularly those in which one or more strokes overlay another stroke as shown in FIG. 3.

Polygon fill 13 is an algorithm capable of drawing the various strokes of the desired character and producing a raster scan signal with a two level output indicating border (B) or interior (I) portions of each stroke. Actually, the logic utilizing signals from polygon fill 13 require the complement of the interior signal so the signal transmitted to a read-modify write logic (RMW LOGIC) 15 over data bus 16 is B/Ī.

Polygon fill 13 also generates address signals which are supplied via address busses 17 through a multiplexer (MUX) 18 to first and second bit planes (BIT PLANE ONE and BIT PLANE TWO) 19 and 20. Bit planes 19 and 20 are hardware storage mediums capable of storing bit maps such as those illustrated in FIGS. 4a and 5a. Bit plane one, 19, stores the bit maps of FIGS. 4a and 6a, containing digital depictions of border (B) signals from polygon fill 13. Bit plane two, 20, stores the bit maps of FIGS. 5a and 7a, containing digital depiction of interior (Ī) signals from polygon fill 13.

The function of RMW LOGIC 15 is to supply modified B/Ī signals from polygon fill 13 to create the bit maps in bit planes one and two (19 and 20). According to this invention bit plane two 20 stores a bit map of all of the digital signals depicting the interiors (Ī) of all of the strokes used to create a character. Bit plane one, 19, on the other hand, stores a bit map of all of the digital signals (B) depicting the borders of all of the strokes used to create the same character, except those signals depicting border regions which have addresses which are the same as addresses of interior ($\bar{I}$) signals in bit plane two 20. To assure that these conditions are met, the LOGIC 15 must receive and assimilate an output signal indicating the condition of the bit map in each of the bit planes 19 and 20. These signals, designated Q1 and Q2, respectively, are fed over data busses 21 and 22 to LOGIC 15.

In operation, RMW LOGIC 15 when it receives an interior signal ($\bar{I}$) from polygon fill 13 it sends a signal D/I2 over signal bus 23 to bit plane two 20 to fill bit map therein with a one (1), and simultaneously sends a signal D/I1 over signal bus 24 to bit plane one 19 to fill the bit map therein with a zero (0). When LOGIC 15 receives a border signal (B) from polygon fill 13 it checks the bit map in bit plane two 20 to see whether the pixel at that address already has a one (1) therein indicating that this is an interior portion of a preceding stroke. If the logic finds that condition in bit plane two then the bit map in bit plane one 19 is filled with a zero (0) and the bit map in bit plane two 20 is filled with a one (1). If LOGIC 15 finds no interior signal in the bit map of bit plane two then it fills the bit map in bit plane one with a one (1) and the bit map in bit plane two with a zero (0).

A truth table for the LOGIC 15 described above is illustrated in FIG. 9. Simplified Boolean algebraic expressions for the signals generated by RMW LOGIC 15 are as follows:

$$D/I1 = B/\bar{I} \cdot \overline{Q2}$$

$$D/I2 = B/I + Q2$$

Note that in simplification of the Boolean expression, as by means of a Karnaugh map (not shown) the variable Q1 becomes a supported reference and has no influence on the required outputs from the RMW LOGIC 15.

The hardware for RMW LOGIC 15 is diagrammed in FIG. 10. As there shown, a negative Q2 signal from bit plane two 20 is combined in an AND gate 25 with the border/interior signal B/$\bar{I}$ to produce output D/I1. Output D/I2 is produced by combining a negative B/$\bar{I}$ signal with signal Q2 in an OR gate 26.

When all of the strokes of the character have been processed through RMW LOGIC 15 into the bit map in bit planes 19 and 20 the bit map in bit plane 19 will contain a map of a pure hollow character like that illustrated in FIG. 3. At this point bit plane one 19, which previously had been functioning as a store memory for information, can now be utilized as a display memory buffer to display the character on a cathode ray tube (CRT) not shown. In order to be so utilized appropriate address information must be obtained from CRTC 14 over bus 27 and via multiplexer 18.

To initiate creation of a new character the bit map in each of the bit planes 19 and 20 is reset to all zeros and the process can be repeated.

It should also be understood that the system described above can also be utilized to create solid characters as well as hollow characters. To produce the former the CPU merely instructs the polygon fill to transmit the B/$\bar{I}$ signals as all ones. This will cause the bit map in bit plane one 19 to become filled to the desired configuration and the second bit plane 20 is not used.

What is claimed is:

1. The method of graphically generating hollow multistroke characters with overlaying strokes having borders and interiors, comprising the steps of creating first and second bit maps depicting, respectively, the border and the interior of a first stroke, modifying said bit maps so that the second bit map depicts the interiors of the first stroke and a second stroke and said first bit map depicts the borders of said first stroke and a second stroke but does not depict any portions of the borders having addresses corresponding to addresses with interior depiction on said second bit map, and displaying the image represented by the modified first bit map.

2. The method of claim 1 wherein a polygon fill is utilized to create said bit maps.

3. The method of claim 2 wherein the modification of said bit maps is accomplished by digital logic.

4. The method of claim 1 wherein the modification of said bit maps is accomplished by digital logic.

5. The method of graphically creating hollow multistroke characters with overlaying strokes having borders and interiors, comprising the steps of generating signals capable of creating first and second bit maps depicting, respectively, the border and the interior of a first stroke, feeding said signals to the bit maps through a digital logic, generating signals capable of creating on said first and second bit maps respectively depictions of the border and the interior of a second stroke, the signals of said second stroke being fed through said digital logic to said bit maps, utilizing the digital logic to compare the signals for said first bit map to the depictions in said second bit map and to alter the signals to said first bit map to eliminate therefrom any border signals having addresses corresponding to interior signals in said second bit map, and displaying the image represented by said first bit map.

6. The method of claim 5 wherein said signals are generated utilizing a polygon fill.

* * * * *